(12) United States Patent
Margulis et al.

(10) Patent No.: US 6,283,786 B1
(45) Date of Patent: Sep. 4, 2001

(54) ELECTRICAL CONNECTOR ASSEMBLY WITH LIGHT TRANSMISSION MEANS

(75) Inventors: Yan Margulis, Buffalo Grove; James T. Roberts, Oak Park, both of IL (US)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 09/215,427

(22) Filed: Dec. 18, 1998

(51) Int. Cl.[7] ....................................... H01R 3/00
(52) U.S. Cl. ..................... 439/488; 439/676; 439/541.5; 439/490
(58) Field of Search ................... 439/490, 488, 439/489, 541.5, 676, 79

(56) References Cited

U.S. PATENT DOCUMENTS

| | | | |
|---|---|---|---|
| 4,887,876 | 12/1989 | Frick et al. | 350/96.2 |
| 5,700,157 | 12/1997 | Chung | 439/490 |
| 5,704,802 | 1/1998 | Loudermilk | 439/490 |
| 5,876,239 | * 3/1999 | Morin et al. | 439/490 |

FOREIGN PATENT DOCUMENTS

| | | |
|---|---|---|
| 3703 423 | 8/1988 | (DE) . |
| 0 365 698 | 10/1988 | (EP) . |
| 2 070 868 | 2/1981 | (GB) . |
| WO98/09347 | 3/1998 | (WO) . |

* cited by examiner

*Primary Examiner*—Gary Paumen
*Assistant Examiner*—Alexander Gilman
(74) *Attorney, Agent, or Firm*—A. A. Tirva

(57) ABSTRACT

A connector assembly includes a housing having a plurality of receptacles, including a top receptacle, for receiving a plurality of mating plugs. A light guide is operatively associated with each receptacle and its respective mating plug to signal a circuit condition thereof. All of the light guides have front ends viewable at the front of the housing above the top receptacle. Each front end has an indicator to visually indicate the receptacle with which the respective light guide is operatively associated.

26 Claims, 4 Drawing Sheets

ELECTRICAL CONNECTOR ASSEMBLY WITH LIGHT TRANSMISSION MEANS

FIELD OF THE INVENTION

This invention generally relates to the art of electrical connectors and, particularly, to an electrical connector which has a built-in light transmission means for visual indication.

BACKGROUND OF THE INVENTION

Electrical connectors having built-in indicator lights have been known for some time. In these connectors, the indicator lights typically are located at the front of the connector. A typical connector may include an integral LED device to emit a light which indicates an operational function such as the reception or transmission of data or voice signals, verification of a good connection between separate pieces of equipment, indication when power is on or off, indication of a defect in a network transmission or any other state or condition in the equipment with which the connector is operatively associated.

Visual light indicating connectors are popular in modular jacks or similar types of connectors commonly used in telecommunications and data networking equipment. These jacks often are mounted on a circuit board to which they are to be connected. Problems have been encountered in incorporating such light indicating devices, such as LED devices, directly onto the connector due to the ever increasing miniaturization and density of telecommunications and data networking equipment.

For instance, electrical connector assemblies in the form of modular jack assemblies include a singular housing having a plurality of receptacles for receiving a complementary plurality of mating plugs. The housing typically is mountable on a printed circuit board. In order to provide light indicating devices for each of the bank or array of receptacles, there simply is not enough space to mount the desired LED devices, for instance, between or around the array of receptacles. In addition, the receptacles typically are arranged in one or more vertical stacks or columns and, if the indicating devices are positioned between the stacked receptacles, the cables of the plugs which are inserted into the receptacles hang down and obscure the light indicating devices. The present invention is directed to solving these various problems.

SUMMARY OF THE INVENTION

An object, therefore, of the invention is to provide a new and improved electrical connector assembly capable of transmitting and indicating light for various visual indication purposes, the assembly being adapted for electrically connecting a plurality of mating plugs, such as electrical connection to a circuit board.

In the exemplary embodiment of the invention, the connector assembly includes a housing adapted for mounting on the circuit board. The housing has a front face with a plurality of stacked receptacles, including a top receptacle, for receiving the plurality of mating plugs. A light guide is operatively associated with each receptacle and its respective mating plug to signal a circuit condition thereof. All of the light guides have front ends viewable at the front of the housing above the top receptacle. Each front end has indicating means to visually indicate the receptacle with which the respective light guide is operatively associated.

As disclosed herein, the housing has a front face at which the front ends of the light guides are viewable. A plurality of terminals are mounted in the housing, and each terminal includes one end extending into one of the receptacles for making electrical contact with a corresponding terminal on the respective plug inserted into that receptacle. Each terminal includes an opposite end adapted to contact the circuit board.

In one embodiment of the invention, the indicating means generally comprises prescribed shapes of the front ends of the light guides. For instance, the front ends of the light guides may be shaped generally in the form of arrows. The front end of the light guide operatively associated with the top receptacle is shaped in the general form of an upwardly directed arrow. The front end of the light guide operatively associated with a receptacle below the top receptacle is shaped in the general form of a downwardly directed arrow.

In another embodiment of the invention, the indicating means is provided by indicia on the front ends of the light guides positionally related to the respective receptacles with which the light guides are operatively associated. For instance, the indicia on the front end of the light guide operatively associated with the top receptacle is an upwardly directed arrow. The indicia on the front end of the light guide operatively associated with a receptacle below the top receptacle is a downwardly directed arrow. Alternatively, the upwardly and downwardly directed arrows could be replaced by "T" and "B" corresponding to the top and bottom receptacles, respectively.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENTS

Figure 1:
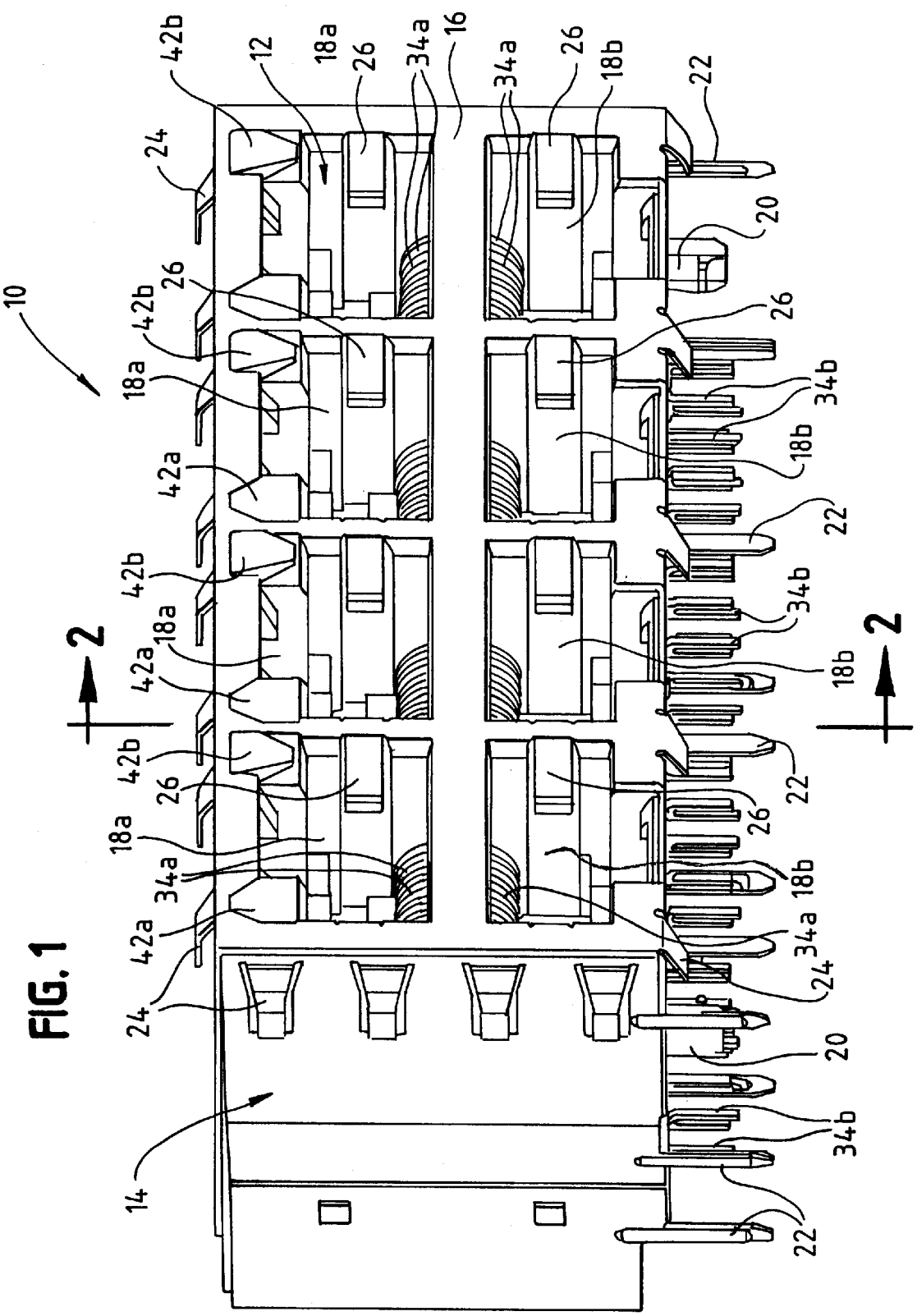
FIG. 1 is a perspective view of a connector assembly incorporating the concepts of the invention.

Referring to the drawings in greater detail, and first to FIG. 1, the invention is embodied in a connector assembly, generally designated 10, adapted for mounting on a printed circuit board. The assembly includes an interior dielectric housing, generally designated 12, and an exterior conductive shield, generally designated 14. The housing may be molded of plastic material, and the shield may be stamped and formed of sheet metal material. The housing and shield combine to define a front face 16 with a plurality of receptacles 18a and 18b for receiving a plurality of mating plugs (not shown). The housing has a plurality of mounting posts 20 for insertion into appropriate mounting holes in the circuit board. Shield 14 has a plurality of legs 22 for insertion into appropriate holes in the circuit board and for connection to appropriate ground traces on the board and/or in the holes. The shield has outwardly bent tabs 24 for engaging in an aperture in a backplane into which the connector assembly may be inserted. The shield has inwardly directed tabs 26 for engaging appropriate shields of the mating plugs which are inserted into receptacles 18*a* and 18*b*.

It can be seen in FIG. 1 that receptacles 18*a* and 18*b* are in four columns or stacks such that receptacles 18*a* are the top receptacles in the column or stack. Receptacles 18*b* are located below the top receptacles. However, it should be understood that the use of the terms "top", "bottom", "above", "below" or the like are used herein and in the claims hereof to provide a clear and concise understanding of the invention in conjunction with the orientations in the drawings. These terms are not intended to be limiting in nature because, obviously, connector assembly 10 could be used in other orientations than that shown in the drawings. For instance, the connector assembly could be reoriented 90° whereby receptacles 18*a* would comprise a left-hand or a right-hand column or stack of receptacles. Yet, the invention described herein would be equally applicable.

Figure 2:
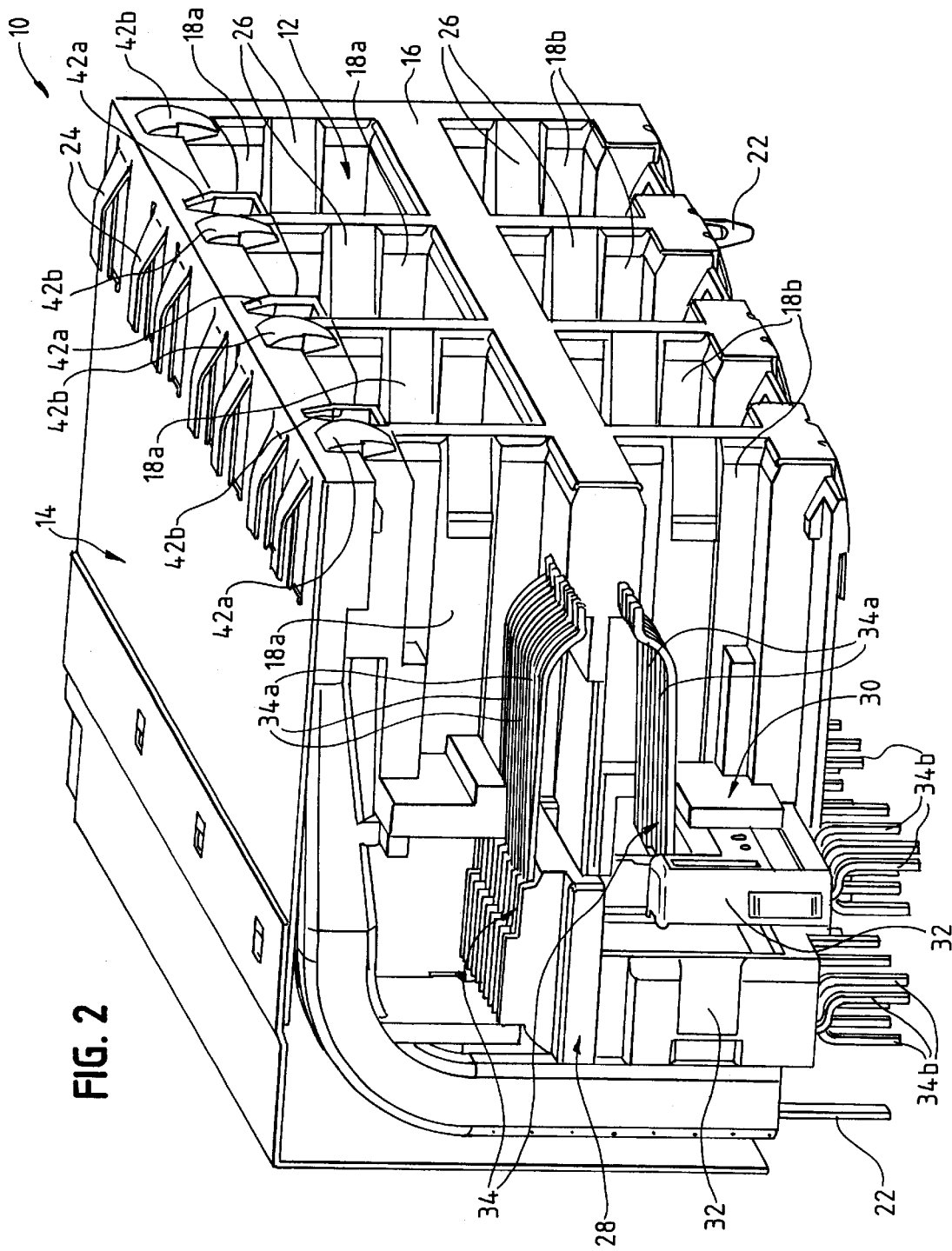
FIG. 2 is a sectioned perspective view taken generally along line 2—2 of FIG. 1.

Referring to FIG. 2 in conjunction with FIG. 1, a terminal module, generally designated 28, is provided for each top receptacle 18*a*, and a terminal module, generally designated 30, is provided for each bottom receptacle 18*b*. Each terminal module includes a dielectric mounting block 32 molded of plastic material and overmolded about a plurality of terminals, generally designated 34. The size and shapes of mounting blocks 32 are different simply to accommodate mounting the terminals with respect to the top and bottom receptacles. Suffice it to say, each terminal 34 includes one end 34*a* extending into a respective one of the receptacles 18*a* or 18*b* for making electrical contact with a corresponding terminal on the respective mating plug inserted into that receptacle. Each terminal includes an opposite end 34*b* for insertion into appropriate holes in the circuit board for connection to signal traces on the board and/or in the holes.

Figure 3:
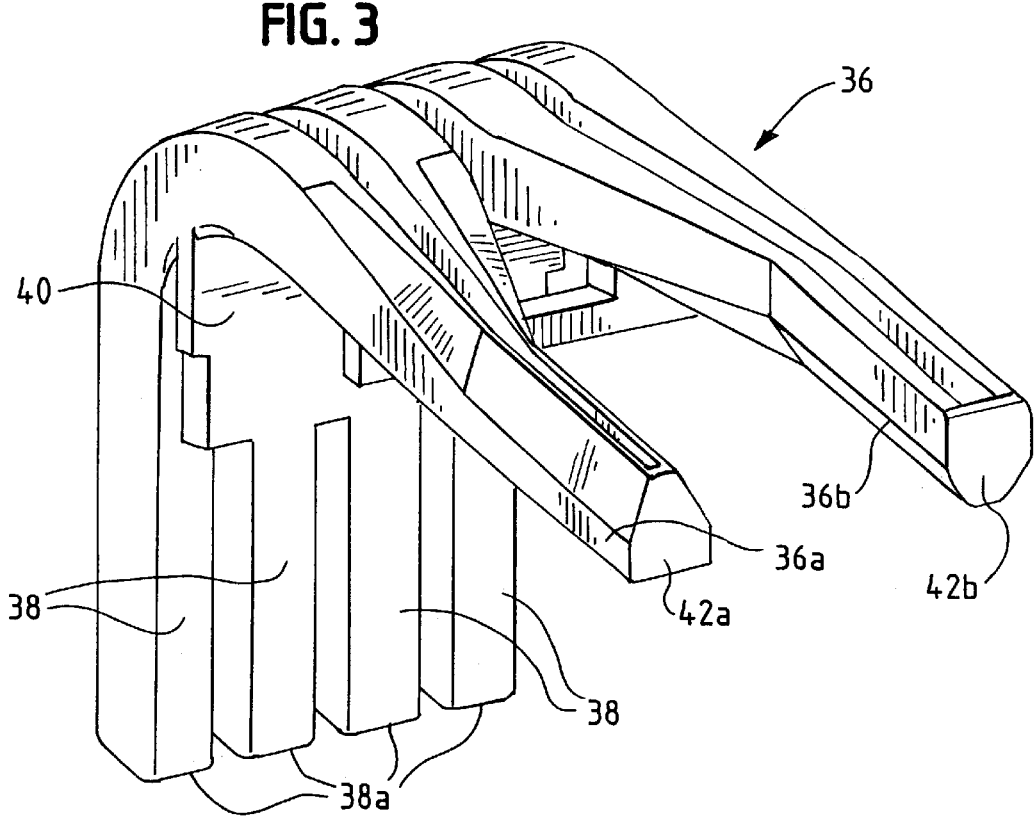
FIG. 3 is a perspective view of the light guide means for one pair of vertically stacked receptacles of the connector assembly.

Referring to FIG. 3 in conjunction with FIGS. 1 and 2, the invention contemplates the provision of light guide means, generally designated 36 (FIG. 3), mountable in housing 12 and viewable through front face 16. One of the light guide means 36 is provided for each pair of stacked receptacles 18*a* and 18*b*. The light guide means includes an individual light guide or pipe 36*a* for the top receptacle 18*a* and a light guide or pipe 36*b* for the bottom receptacle 18*b*. Each light guide 36*a* and 36*b* extends rearwardly and diverges into a pair of branches 38 having bottom ends 38*a* which are juxtaposed above a plurality of LED's mounted on the circuit board. Two branches 38 are provided for each light guide 36*a* or 36*b*, along with a pair of LED's for the purpose of indication of various operational functions, simultaneously, for example: status of the port and speed of the transmission, etc. The entire light guide means 36, including individual light guides 36*a*/36*b* and their branches 38, is a unitary homogeneous molded structure held together by a unitary brace portion 40. For instance, this unitary homogeneous structure may be fabricated of such materials as a substantially clear polycarbonate material. Of course, light guides 36*a* and 36*b* are operatively associated with their top and bottom receptacles 18*a* and 18*b*, respectively, through appropriate circuitry on the circuit board associating the LED's for each light guide with the terminals for its respective receptacle.

Figure 4:
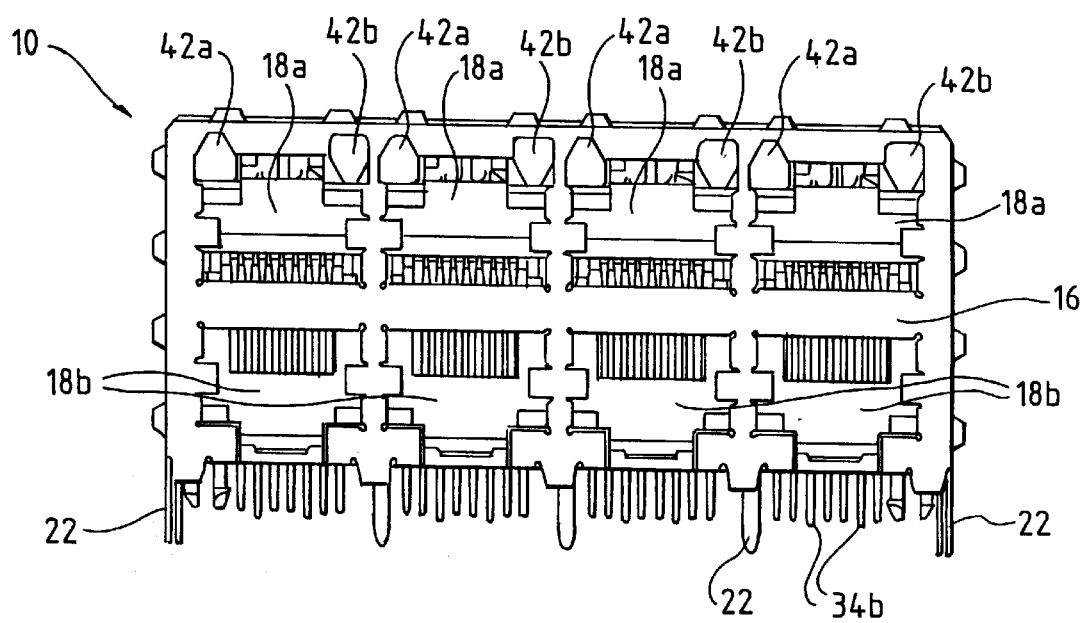
FIG. 4 is a front elevational view of the connector assembly.

Referring to FIG. 4 in conjunction with FIGS. 1–3, each light guide 36*a* and 36*b* terminates in a front distal end 42*a* and 42*b*, respectively. The invention contemplates that the front ends of the light guides be provided with indicating means to visually indicate the receptacle with which the respective light guide is operatively associated. To that end, it can be seen that front end 42*a* of light guide 36*a* for each top receptacle 18*a* is shaped in the general form of an upwardly directed triangle or arrow. Correspondingly, front end 42*b* of light guide 36*b* for each bottom receptacle 18*b* is shaped in the general form of a downwardly directed triangle or arrow. Therefore, an observer can easily understand that front end 42*a* of light guide 36*a* is operatively associated with the top receptacle 18*a* by the orientation of the arrow-shaped front end. In addition, it can be seen that all of the front ends 42*a* and 42*b* of the light guides are located above the top receptacles so that the cables from the plugs inserted into the receptacles cannot obscure clear vision of the light indicating means afforded by the light guides.

Figure 5:
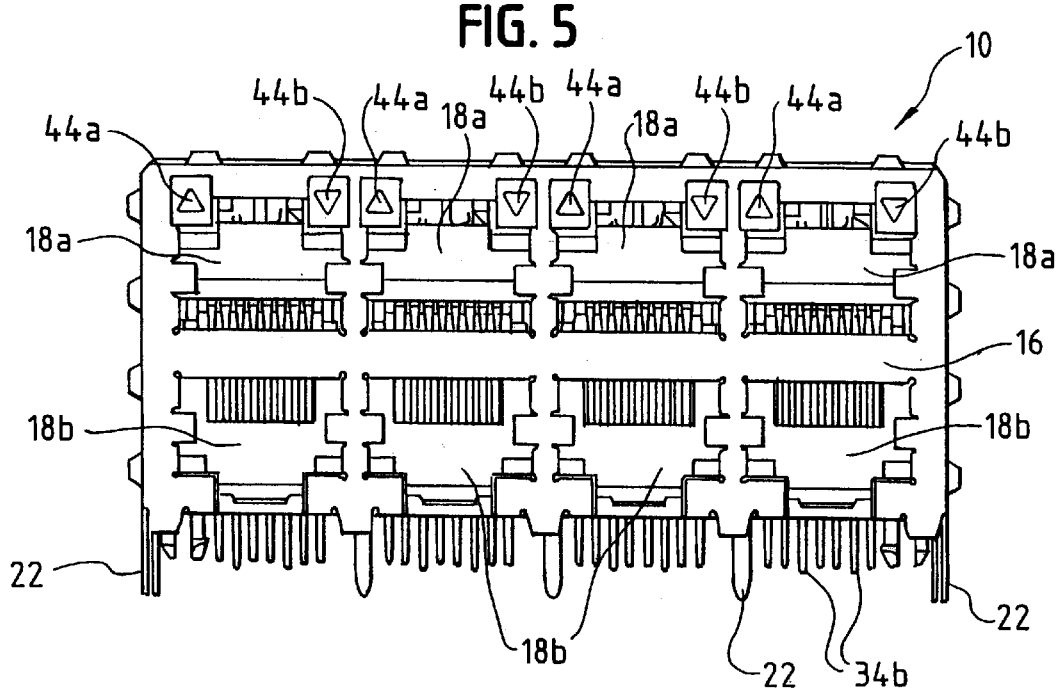
FIG. 5 is a view similar to that of FIG. 4, but showing an alternate embodiment of the indicating means.

FIG. 5 shows an alternative embodiment of the invention wherein front ends 42*c* of all of the light guides or pipes have similar polygonal (rectangular) shapes, versus the triangular or arrow shapes of front ends 42*a* and 42*b* in the embodiment of FIGS. 1–4. In the embodiment of FIG. 5, the indicating means is provided by arrows 44*a* and 44*b* which can be embossed, painted or otherwise imprinted onto the front ends of the light guides. In other words, upwardly directed arrows 44*a* would provide visual indication for top receptacles 18*a* and downwardly directed arrows 44*b* would provide visual indication for bottom receptacles 18*b*.

Figure 6:
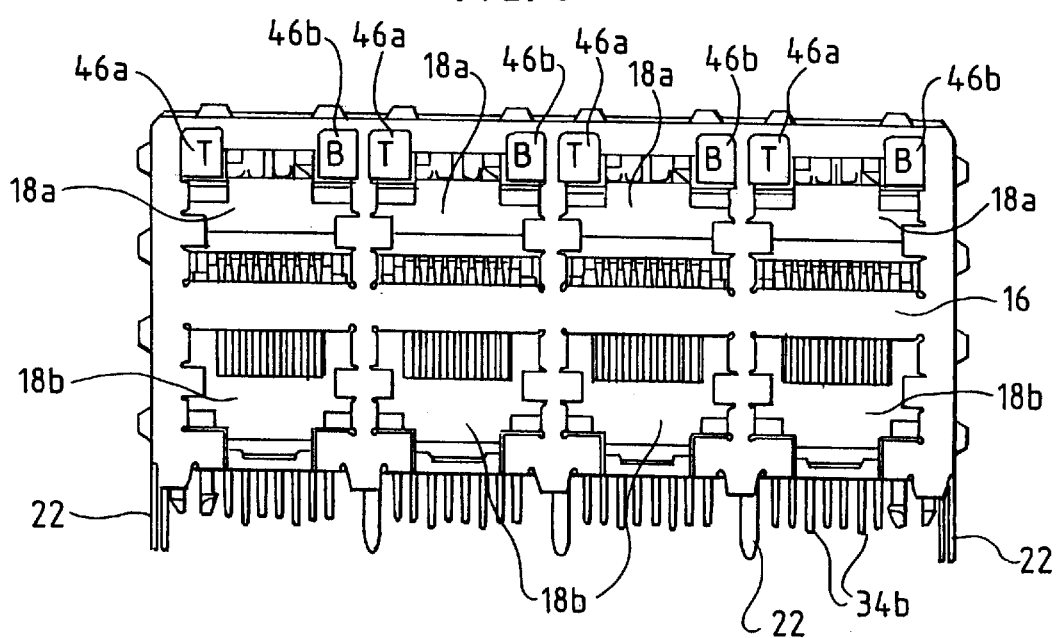
FIG. 6 is a view similar to that of FIGS. 4 and 5, but showing a third embodiment of the indicating means.

FIG. 6 shows a further embodiment of the invention where, again, all of the front ends 42*c* of the light guides are located above the top receptacles 18*a*. The difference between the embodiment of FIG. 6 and the embodiment of FIG. 5 is that the upwardly and downwardly directed arrows 44*a* and 44*b* (FIG. 5), respectively, have been replaced by letter designations 46*a* and 46*b* (FIG. 6). Specifically, the letters "T" (46*a*) and "B" (46*b*) are used on the front ends of the light guides operatively associated with the top and bottom receptacles 18*a* and 18*b*, respectively.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A connector assembly for electrically connecting a plurality of mating plugs to a circuit board, comprising:

a housing adapted for mounting on the circuit board, the housing having a front face with a plurality of stacked receptacles, including a top receptacle and a bottom receptacle, for receiving said plurality of mating plugs;

a plurality of terminals each including one end extending into one of said receptacles for making electrical contact with a corresponding terminal on the respective plug inserted into that receptacle and an opposite end adapted to contact the circuit board; and light guide means on the housing and viewable through the front face thereof, including a light guide operatively associated with each of the top and bottom receptacles and its respective mating plug to signal a circuit condition thereof, all of the light guides having front ends at the front face of the housing above the top receptacle, and each front end having indicating means to visually indicate the top or bottom receptacle with which the respective light guide is operatively associated.

2. The connector assembly of claim 1 wherein said indicating means comprises prescribed shapes of the front ends of the light guides.

3. The connector assembly of claim 2 wherein the front ends of the light guides are shaped generally in the form of arrows.

4. The connector assembly of claim 3 wherein the front end of the light guide operatively associated with said top receptacle is shaped in the general form of an upwardly directed arrow.

5. The connector assembly of claim 4 wherein the front end of the light guide operatively associated with a receptacle below said top receptacle is shaped in the general form of a downwardly directed arrow.

6. The connector assembly of claim 1 wherein said indicating means comprises indicia on the front ends of the light guides positionally related to the respective receptacles with which the light guides are operatively associated.

7. The connector assembly of claim 6 wherein the indicia on the front end of the light guide operatively associated with said top receptacle is an upwardly directed arrow.

8. The connector assembly of claim 7 wherein the indicia on the front end of the light guide operatively associated with a receptacle below said top receptacle is a downwardly directed arrow.

9. The connector assembly of claim 6 wherein the indicia on the front end of the light guide operatively associated with said top receptacle is a letter "T".

10. The connector assembly of claim 9 wherein the indicia on the front end of the light guide operatively associated with a receptacle below said top receptacle is the letter "B".

11. A connector assembly for connection to a plurality of mating plugs, comprising:
    a housing having a plurality of receptacles, including a top receptacle and a bottom receptacle, for receiving said plurality of mating plugs; and
    a light means operatively associated with each of the top and bottom receptacles and its respective mating plug to signal a circuit condition thereof, all of the light means being viewable at the front of the housing above the top receptacle and having indicating means to visually indicate the top or bottom receptacle with which the respective light means is operatively associated.

12. The connector assembly of claim 11 wherein said indicating means comprise prescribed shapes of the light means at the front of the housing.

13. The connector assembly of claim 12 wherein the light means at the front of the housing are shaped generally in the form of arrows.

14. The connector assembly of claim 13 wherein the light means operatively associated with said top receptacle is shaped in the general form of an upwardly directed arrow.

15. The connector assembly of claim 14 wherein the light means operatively associated with a receptacle below said top receptacle is shaped in the general form of a downwardly directed arrow.

16. The connector assembly of claim 11 wherein said indicating means comprises indicia on the light means positionally related to the respective receptacles with which the light means are operatively associated.

17. The connector assembly of claim 16 wherein the indicia on the light means operatively associated with said top receptacle is an upwardly directed arrow.

18. The connector assembly of claim 17 wherein the indicia on the light means operatively associated with a receptacle below said top receptacle is a downwardly directed arrow.

19. The connector assembly of claim 16 wherein the indicia on the light means operatively associated with said top receptacle is a letter "T".

20. The connector assembly of claim 19 wherein the indicia on the light means operatively associated with a receptacle below said top receptacle is the letter "B".

21. A connector adapted to be mounted on a circuit board and having a front face, said connector comprising:
    a housing having a plurality of stacked receptacles, each of which receptacles including a first receptacle mounted upon a second receptacle;
    a plurality of terminals each including one end extending into one of said first and second receptacles and an opposite end adapted to contact the circuit board; and
    a first light guide operatively associated with each of said first receptacles and viewable from said front face thereof to provide an indication of a circuit condition thereof and a second light guide operatively associated with each of said second receptacles and viewable from said front face thereof to provide an indication of a circuit condition thereof, each of said first light guides having a first front end at said front face of the housing at the uppermost portion of said first receptacle, said first front end having a first indicator to visually indicate that said first light guide is operatively associated with said first receptacle and each of said second light guides having a second front end at said front face of said housing at the uppermost portion of said first receptacle, said second front end having a second indicator to visually indicate that said second light guide is operatively associated with said second receptacle.

22. The connector of claim 21 wherein said first indicator comprises a first prescribed shape at said front face of said housing and said second indicator comprises a second prescribed shape at said front face of said housing.

23. The connector of claim 22 wherein said first prescribed shape is generally in the form of a first arrow pointing away from said second receptacle and said second prescribed shape is generally in the form of a second arrow pointing toward said second receptacle.

24. The connector of claim 21 wherein said first indicator comprises first indicia on said first light guide to indicate that said first light guide is associated with said first receptacle and said second indicator comprises second indicia on said second light guide positioned to indicate that said second light guide is associated with said second receptacle.

25. The connector of claim 24 wherein said first indicia is an upwardly directed arrow and said second indicia is a downwardly directed arrow.

26. The connector of claim 24 wherein said first indicia is the letter "T" and second indicia is the letter "B".

* * * * *